UNITED STATES PATENT OFFICE 2,601,520

DIALKENYL ALKANEPHOSPHONATES AND POLYMERS THEREOF

Denham Harman and Alan R. Stiles, Berkeley, Calif., assignors to Shell Development Company, San Francisco, Calif., a corporation of Delaware No Drawing. Application June 24, 1949, Serial No. 101,254

12 Claims. (Cl. 260—80)

This invention relates to a new class of unsaturated phosphonates. More particularly, the invention provides unsaturated diesters of alkanephosphonic acids and cyclic hydrocarbon-substituted alkanephosphonic acids and the polymers of such diesters.

The new esters are prepared by reacting unsaturated triesters of phosphorus acid with the corresponding hydrocarbon halide. The reaction can be expressed by the equation,

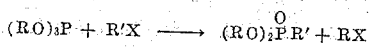

The new esters have been found to exhibit properties which are predominantly those of unsaturated diesters of saturated aliphatic dibasic acids. They have been found to exhibit a pronounced resistance to burning and to impart a resistance to burning to compositions containing them as a component of a mixture, in solution, or in the form of a chemically bound component. By virtue of the predominantly saturated aliphatic characteristics of their acyl radicals, the monomeric compounds of the invention, which are colorless, oily liquids have proven to be unique and particularly valuable plasticizers and modifying agents for many types of polymers. The new esters polymerize to form particularly valuable polymers and copolymers having unique characteristics of color, clarity, hardness and resistnce to deterioration.

The new esters are compounds of the formula

where each R represents an unsaturated hydrocarbon radical and R′ represents an alkane radical which may be substituted by one or more cycloalkane or aryl radicals. Such esters in which the radicals represented by R are alkenyl have been found to provide monomers for the formation of a preferred class of polymers, particularly when the olefinic group is in a terminal position. Esters in which the radicals represented by R are the allyl radicals or its terminally unsaturated homologs (radicals of the formula C(R)₂C(R)=CH₂ where each R represents a hydrogen atom or an alkyl radical) are especially suitable. Thus, dialkenyl alkanephosphonates and dialkenyl aralkanephosphonates in which each alkenyl radical contains the group —C—C=CH₂ attached to the oxygen atom constitute particularly valuable subclasses of the new esters.

Illustrative examples of the compounds provided by the present invention include diallyl butanephosphonate, diallyl phenylmethanephosphonate, dicinnamyl methanephosphonate, dimethallyl eicosanephosphonate, divinyl paratolyl-methanephosphonate, divinyl 2-cyclohexylethanephosphonate, poly(diallyl butanephosphonate), poly(diallyl phenylmethanephosphonate), dimethallyl propanephosphonate-diallyl phthalate copolymer, diallyl 2-phenylpropanephosphonate-diallyl maleate copolymer and divinyl pentanephosphonate-vinyl chloride copolymer.

In preparing the monomeric compounds of the present invention by reacting the corresponding unsaturated triester of phosphorus acid with the corresponding hydrocarbon halide, the reaction is preferably conducted at about the reflux temperature of the reaction mixture under atmospheric pressure.

Illustrative examples of unsaturated triesters of phosphorus from which the compounds of the present invention can be prepared include triallyl phosphite, trimethallyl phosphite, trivinyl phosphite, tri-2-butenyl phosphite, tri-isopropenyl phosphite, tricinnamyl phosphite and tri-2-cyclohexylallyl phosphite.

Illustrative examples of hydrocarbon halides from which the compounds of the present invention can be prepared include butyl chloride, benzyl chloride, propyl bromide, para-methylbenzyl iodide, cyclohexylmethyl chloride and tertiary-butyl chloride.

The polymeric compounds of the present invention are prepared by polymerizing or copolymerizing the monomeric compounds of the invention. The polymerization is preferably conducted by heating the compounds in the presence of free radicals. A wide variety of procedures for polymerizing organic compounds in the presence of free radicals are known and can suitably be employed to form the polymeric compounds of the present invention. A particularly suitable procedure consists of heating the monomers to be polymerized in the presence of a peroxidic compound which decomposes to form free radicals at a temperature at which the monomers and polymers are stable. The mixture is heated at about the decomposition temperature of the peroxidic compound.

Illustrative examples of compounds which when heated with the monomeric compounds of the invention or mixtures of polymerizable compounds containing them initiate the formation of the polymers and copolymers provided by the present invention include di-tertiary-butyl peroxide, dibenzoyl peroxide, tertiary-butyl hydroperoxide, 2,2-bis(tertiary-butylperoxy)butane, tertiary-butyl perbenzoate and di-tertiary-butyl diperoxalate.

The following examples are presented to illustrate in detail procedures by which the compounds provided by the present invention can suitably be prepared. As the compounds provided by the invention can have a variety of different structures, and in some cases can be prepared by other procedures, the invention is not to be construed as limited to the particular materials or conditions specified in the examples.

*Example I*

Diallyl phenylmethanephosphonate is produced by refluxing for 20 hours at 130° C. a solution consisting of 126 grams of benzyl chloride and 100 grams of triallyl phosphite. The ester is isolated by a fractional distillation of the reaction mixture. The diallyl phenylmethanephosphonate is a colorless, oily liquid having a boiling point of 144–145° C. under 0.5 mm. Hg pressure and a refractive index ($n$ 20/D) of 1.5132. The structure of the diallyl phenylmethanephosphonate is verified by the fact that the ester is found to contain 12.3% phosphorus and to have a molecular weight of 264. These figures are in good agreement with the value of 12.2% phosphorus and the molecular weight of 253 calculated from the formula for the product, namely

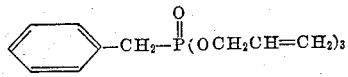

*Example II*

Diallyl butanephosphonate is produced by refluxing for 20 hours at 70° C. a solution consisting of 500 grams of butyl chloride and 100 grams of triallyl phosphite. The ester, a colorless, oily liquid having a boiling point of 97–99° C. under 2 mm. Hg pressure and a refractive index ($n20/D$) of 1.4553, is isolated by a fractional distillation of the reaction products. The diallyl butanephosphonate is found to contain 15.0% of phosphorus and to have a molecular weight of 212, in good agreement with the value of 14.2% phosphorus and the molecular weight of 218 calculated from the formula for the product, namely

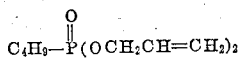

*Example III*

Poly(diallyl phenylmethanephosphonate) is prepared by heating a solution consisting of 50 grams of diallyl phenylmethanephosphonate and 0.5 gram of di-tertiary-butyl peroxide at a temperature of 115° C. for 20 hours. The colorless, water clear polymer is isolated by extracting or fractionally distilling off the unreacted monomers.

*Example IV*

Poly(diallyl butanephosphonate) is prepared by heating a solution consisting of 50 grams of diallyl butanephosphonate and 0.5 gram of di-tertiary-butyl peroxide at a temperature of 115° C. for 20 hours. The colorless polymer is isolated by extracting or fractionally distilling off the unreacted monomers.

*Example V*

A solid copolymer of diallyl butanephosphonate and diallyl phthalate is prepared by heating a solution consisting of 90 grams of diallyl phthalate, 10 grams of diallyl butanephosphonate and 2 grams of benzoyl peroxide for 24 hours at 450° C., 6 hours at 90° C. and 18 hours at 115° C. The polymer is isolated by extracting or fractionally distilling off the unreacted monomers and catalyst.

We claim as our invention:
1. Diallyl butanephosphonate.
2. Diallyl phenylmethanephosphonate.
3. Poly(diallyl butanephosphonate).
4. A diallyl alkanephosphonate.
5. A dialkenyl alkanephosphonate.
6. A polymer of a dialkenyl alkanephosphonate.
7. A dialkenyl carbocyclic-substituted alkanephosphonate.
8. A poly of a dialkenyl carbocyclic-substituted alkanephosphonate.
9. A dialkenyl alkanephosphonate in which both alkenyl radicals contain a lower 2-alkenyl group attached to the oxygen atom.
10. A dialkenyl arylalkanephosphonate in which both alkenyl radicals contain a lower 2-alkenyl group attached to the oxygen atom.
11. A phosphonic acid ester having the structure defined by the formula

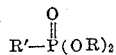

in which each R represents a mono-olefinically unsaturated hydrocarbon radical and R' represents a member of the group consisting of alkane radicals and carbocyclic-substituted alkane radicals.

12. A polymer of an ester defined in claim 11.

DENHAM HARMAN.
ALAN R. STILES.

REFERENCES CITED

The following references are of record in the file of this patent:

UNITED STATES PATENTS

| Number | Name | Date |
|---|---|---|
| 2,397,422 | Kosolopoff | Mar. 26, 1946 |
| 2,425,766 | Fon Toy | Aug. 19, 1947 |

OTHER REFERENCES

Kosolopoff: J. Am. Chem. Soc., 67, 2259–60, (Dec. 1945).

Chem. and Eng. News, 25, page 2030, July 14, 1947.

Fon Toy: J. Am. Chem. Soc., 70, 186–188, (Jan. 1948).